United States Patent
Thackston

(10) Patent No.: US 7,069,093 B2
(45) Date of Patent: Jun. 27, 2006

(54) SYSTEM AND PROCESS FOR FACILITATING EFFICIENT COMMUNICATION OF SPECIFICATIONS FOR PARTS AND ASSEMBLIES WITH A MECHANISM FOR ASSIGNING RESPONSIBILITY SELECTION

(76) Inventor: James D. Thackston, 302 Harbour Place Dr., Apt. 3110, Tampa, FL (US) 33602

( * ) Notice: Subject to any disclaimer, the term of this patent is extended or adjusted under 35 U.S.C. 154(b) by 442 days.

(21) Appl. No.: 10/005,350

(22) Filed: Dec. 7, 2001

(65) Prior Publication Data

US 2002/0072820 A1    Jun. 13, 2002

Related U.S. Application Data

(60) Provisional application No. 60/251,585, filed on Dec. 7, 2000.

(51) Int. Cl.
  *G06F 19/00* (2006.01)
(52) U.S. Cl. .................. 700/97; 705/50; 713/716
(58) Field of Classification Search .................. 700/95, 700/97, 180, 231, 245; 703/1; 345/419, 345/961; 713/168, 176; 705/27, 75, 67, 705/29, 8, 26, 50
See application file for complete search history.

(56) References Cited

U.S. PATENT DOCUMENTS

| | | | |
|---|---|---|---|
| 5,715,402 A * | 2/1998 | Popolo | 705/37 |
| 5,748,738 A | 5/1998 | Bisbee et al. | |
| 5,794,207 A * | 8/1998 | Walker et al. | 705/1 |
| 5,838,906 A * | 11/1998 | Doyle et al. | 709/202 |
| 5,862,223 A * | 1/1999 | Walker et al. | 705/50 |
| 6,091,835 A | 7/2000 | Smithies et al. | |
| 6,138,104 A * | 10/2000 | Marchak et al. | 705/9 |
| 6,292,712 B1 * | 9/2001 | Bullen | 700/245 |
| 6,295,513 B1 * | 9/2001 | Thackston | 703/1 |
| 6,684,212 B1 * | 1/2004 | Day et al. | 707/10 |
| 6,741,265 B1 * | 5/2004 | Ghosh et al. | 715/751 |
| 6,889,325 B1 * | 5/2005 | Sipman et al. | 713/176 |

OTHER PUBLICATIONS

PCT—International Search Report dated Jul. 22, 2002, for Application Serial No. PCT/US01/45760, filed Dec. 7, 2001.

* cited by examiner

*Primary Examiner*—Leo Picard
*Assistant Examiner*—Sheela S. Rao
(74) *Attorney, Agent, or Firm*—McGuireWoods LLP

(57) ABSTRACT

The present invention relates generally to a comprehensive, integrated computer-based process and method for undertaking an engineering design and development effort in a virtual collaborative environment by facilitating communication of specifications for parts and assemblies for review and approval. Specifications for the fabrication of parts may be presented and reviewed by the user. By accepting or validating the specifications, the user may apply his/her digital signature, thereby confirming an understanding of the specifications and, according to an embodiment of the invention, creating a binding contract.

25 Claims, 17 Drawing Sheets

SYSTEM AND PROCESS FOR FACILITATING EFFICIENT COMMUNICATION OF SPECIFICATIONS FOR PARTS AND ASSEMBLIES WITH A MECHANISM FOR ASSIGNING RESPONSIBILITY SELECTION

CROSS REFERENCE TO PRIOR APPLICATIONS

This application claims priority under 35 U.S.C. §119(e) to U.S. Provisional Application Ser. No. 60/251,585 filed on Dec. 7, 2000.

FIELD OF THE INVENTION

The present invention relates generally to a comprehensive, integrated computer-based process and method for undertaking an engineering design and development effort in a virtual collaborative environment by facilitating communication of specifications for parts and assemblies for review and approval. Further, the present invention relates to assigning responsibility to one or more persons charged with reviewing and approving specifications, thereby helping to ensure that specifications and changes are reviewed by the appropriate people and errors in the specifications are corrected and avoided.

BACKGROUND OF THE INVENTION

Most design documents describing a design submitted for fabrication involve either two dimensional drawings or three dimensional electronically generated and distributed solid models. The term 'part design' or 'part' may comprise objects for which specifications, such as engineering or manufacturing specifications, are necessary to properly manufacture the object. This may includes, but is not limited to machined, forged, or cast parts, commercial structures, bridges, highways, naval structures, articles of clothing, circuit boards, or any other manufactured item requiring manufacturing instructions to explain the fabrication process.

Both two-dimensional ("2D") and three-dimensional ("3D") design representations may contain information describing how certain features of design are to be fabricated, through the use of symbols that are universally understood to describe various specification types. Symbols may provide specification types such as weld types, diameter, flatness, cylindricity, circularity, straightness, surface finish, material, distance, and many other specifications used for a particular part and/or object. Sometimes, drawing notes must be written on a 2D drawing to add further critical information such as which manufacturing standards and regulations must be applied during the fabrication of a part. Currently, free-form information for a 3D solid model is saved in a different electronic file, thereby requiring a user accessing the 3D model design to access another file as well.

Business-to-business activity involving the communication of specifications for parts and/or objects may be very complex, with many opportunities for miscommunication of specifications associated with a given design. Some specifications necessary for proper manufacturing may be inadvertently left out of 2D drawings or 3D solid model files. In some cases, the engineer responsible for approving 2D drawings may approve a faulty design package because incorrect or missing specifications are overlooked.

Although the use of 3D solid models is increasing, many design packages sent to fabrication vendors for bid include only 2D drawings to represent the 'official' description of the design. Interpretation of a 2D representation of an inherently 3 dimensional object may be much more difficult than a representation that is itself 3D. Many times, the symbols and notes printed on a drawing are inadequate to completely communicate the intent of the designer. Misinterpretation usually leads to lengthy interaction with the designer or complete rework of an incorrectly fabricated part. This leads to tremendous waste in material, time, and money. In many cases, the current method of describing designs provides insufficient information to the fabrication vendor tasked with making the part.

Another problem associated with 2D drawings may be the drawing approval process. A person with approval authority, such as an engineer or designer, must carefully review each and every specification printed on a drawing. For very complex designs, there may be a large number of symbols, numbers, lines, and notes that must be checked against the design requirements. Inspection is typically a very tedious and time consuming process. A project that is behind schedule may force a quick review by the approving engineer, and errors may be overlooked. When an approval signature is given, it is applied to an entire drawing rather than to individual specifications, increasing the likelihood that faulty drawing packages will be forwarded for fabrication.

Three-dimensional solid models eliminate some of the interpretation issues associated with 2D drawings but the representation of individual specifications is still done using symbols. Furthermore, notes are usually applied to the part model as a whole and not to individual components within the model and then are typically not included in the electronic file containing the 3D graphical data. This means that the notes are even more detached from the visual information in 3D models than they are in 2D drawings.

The problem of approval signatures may be even more significant when dealing with electronic 3D solid models. Whereas a signature can be directly applied to a 2D paper drawing, such a capability may be more difficult for electronic models. When 3D models are used to convey 'official' designs, an approval signature is often applied to a control document that accompanies the electronic file containing the 3D solid model.

Other drawbacks may also exist.

SUMMARY OF THE INVENTION

It is therefore desirable that the invention overcome these and other drawbacks of present systems and methods.

It is further desirable to reduce errors in design packages before they are sent out for fabrication.

It is also desirable to improve the ability of a fabrication vendor to rapidly interpret a given part design in terms of both design and manufacturing intent.

Another benefit may be to facilitate specification level application of digital signatures to assign responsibility, including legal responsibility, for individual specifications appearing within a three-dimensional solid model.

A feature of the present invention may be to provide a process for validating at least one specifications for part, where the at least one specification provides instructions for the fabrication of the part. The process may comprise the steps of receiving a selection of a part to display; presenting the selected part; receiving a selection of a feature of the selected part to review; presenting the specification associated with the selected feature, where the associated specification provides information about the selected feature; presenting a authorization frame comprising a validation button and a rejection button, where the authorization frame is associated with the specification; and receiving an authorization selection from the user, where the authorization selection is based on the selection of one of the validation button and the rejection button.

It may also be desirable to provide a system for validating at least one specifications for part, where the at least one specification provides instructions for the fabrication of the part. This system may comprise a means for storing files containing data related to at least one part and the at least one specification for the part; a means for receiving, where the means for receiving receives: a) a selection of a part to present; and b) a selection of a feature of the part; a means for presenting, wherein the means for presenting presents: a) a representation of the selected part; b) the specification associated with the selected feature, where the associated specification provides information about the selected feature; and c) an authorization frame comprising a validation button and a rejection button, where the authorization frame is associated with the specification; a means for processing the received instructions; and wherein the means for receiving receives an authorization selection from the user, where the authorization selection is based on the selection of one of the validation button and the rejection button.

An additional feature may be a medium storing code for causing a processor to validate at least one specifications for part, where the at least one specification provides instructions for the fabrication of the part. The medium may comprise code for causing a receiver to receive a selection of a part; code for causing a processor to present the selected part; code for causing the receiver to receive a selection of a feature of the part to review; code for causing the processor to present the specification associated with the selected feature, where the associated specification provides information about the selected feature; code for causing the processor to present a authorization frame comprising a validation button and a rejection button, where the authorization frame is associated with the specification; and code for causing the receiver to receive an authorization selection from the user, where the authorization selection is based on the selection of one of the validation button and the rejection button.

The accompanying drawings, which are incorporated in and constitute a part of this specification, illustrate an embodiment of the invention and, together with the description, serve to explain the principles of the invention.

BRIEF DESCRIPTION OF THE FIGURES

Figure 8:
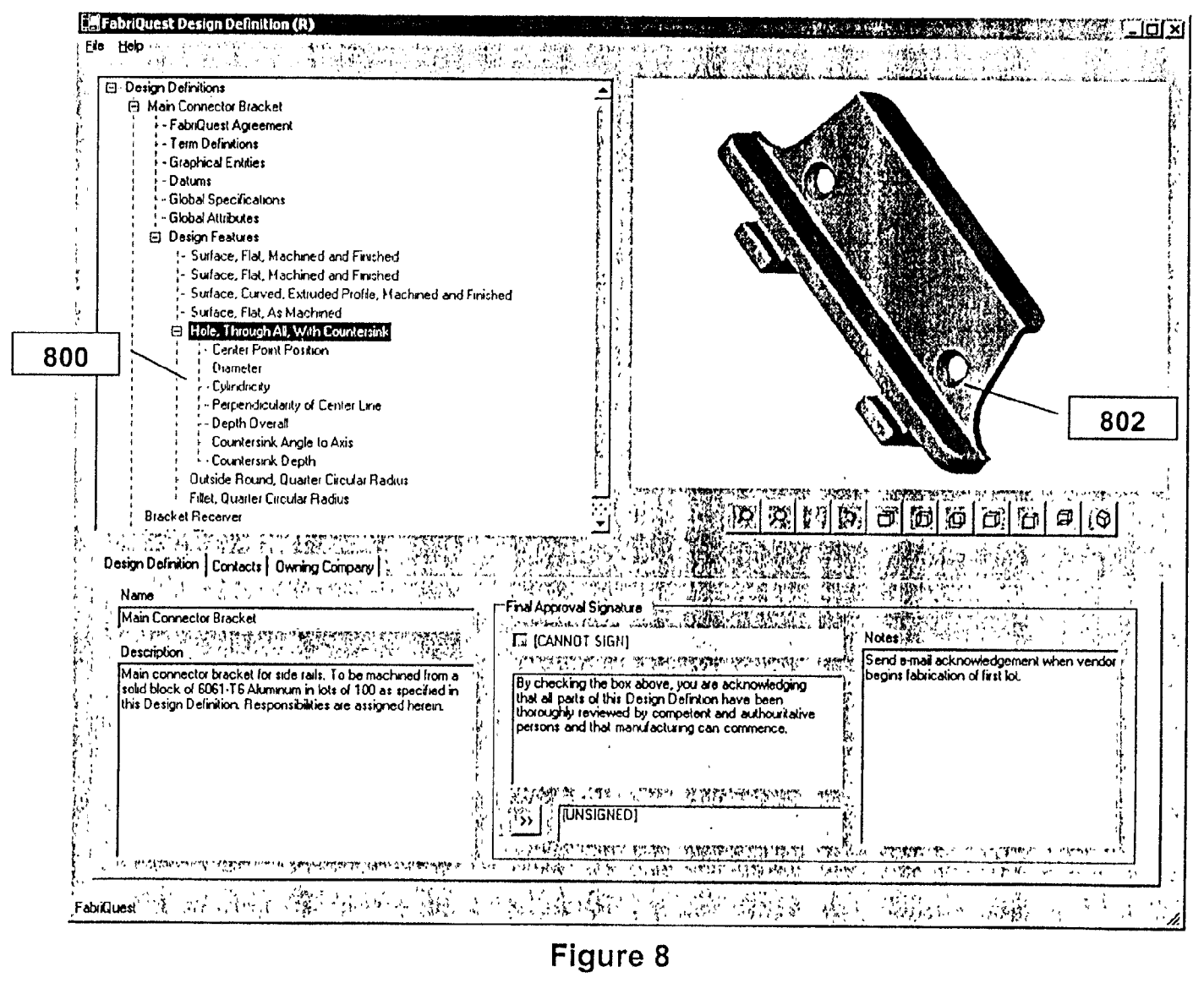

FIGS. 7, 8, and 9 show the main user interface screen used by a designer to approve the electronic design representation according to an embodiment of the invention.

FIGS. 10–17 illustrate a graphic user interface for displaying a feature specification associated with a design feature selected in the 3D graphic representation of the part displayed on the main user interface screen according to an embodiment of the invention.

DETAILED DESCRIPTION OF THE INVENTION

Figure 1:
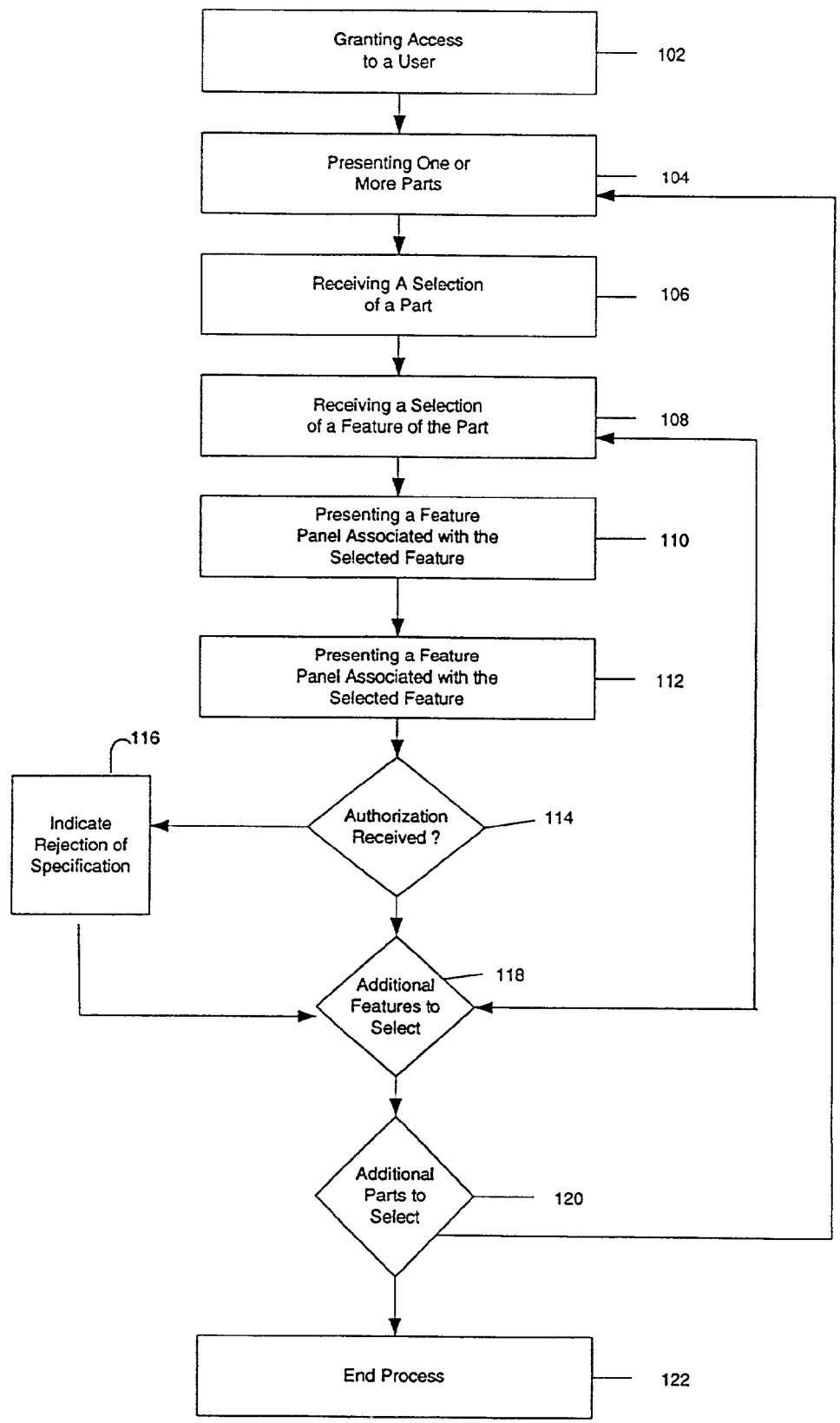
FIG. 1 is flowchart illustrating a process for approving an electronic specification according to an embodiment of the invention.

Reference will now be made in detail to the present preferred embodiments of the invention, examples of which are illustrated in the accompanying drawings in which like reference characters refer to corresponding elements.

As described above, the term 'part design' or 'part' may comprise objects for which specifications, such as engineering or manufacturing specifications, are necessary to properly manufacture the object. This may includes, but is not limited to machined, forged, or cast parts, commercial structures, bridges, highways, naval structures, articles of clothing, circuit boards, or any other manufactured item requiring manufacturing instructions to explain the fabrication process.

Both 2D and 3D design representations may contain information describing how certain features of design are to be fabricated, through the use of symbols that are universally understood to describe various specification types. Symbols may provide specification types such as weld types, diameter, flatness, cylindricity, circularity, straightness, surface finish, material, distance, and many other specifications used for a particular part and/or object. Sometimes, drawing notes must be written on a 2D drawing to add further critical information such as which manufacturing standards and regulations must be applied during the fabrication of a part.

By way of an example of a specification for a machine shop part, a hole may be specified in a drawing or 3D solid model as having a nominal diameter of 1.000 inches, +/−0.005 inches. This means that the hole diameter may be measured between 1.005 inches and 0.995 inches and still be within specification. By way of another such example, a design for a mirror blank represented by a 2D drawing or 3D solid model representing a mirror blank will have a specification for flatness. The specification will define the maximum allowable distance between two perfectly flat (imaginary) parallel planes, one resting at the deepest allowable scratch or gouge and one resting on the highest allowable ridge. According to a further such example, a part that is to be machined may have a detailed material specification applied. This specification may require that the part be machined from a cast billet of Inconel 718 nickel alloy. Furthermore, the specification may require that, prior to the start of the machining process, the billet be inspected and certified as being free of cracks, inclusions, and other such defects both at the surfaces and internally.

By way of an example in the course of fabricating an article of clothing, a broad range of manufacturing instructions are required to properly communicate the procedures of fabrication. These include but are not limited to fabric type, stitch type, fabric panel shape and dimensions, seam widths, seam locations, and artwork placement. In this example of the present invention, specifications may encompass the entire range of instructions involved in describing the fabrication process for producing articles of clothing.

According to an example of a specification for a commercial structure, various essential dimensions may be defined such as floor slab depth, column height, concrete mixture specifications, or window dimensions. These are only few examples of specifications that would be involved in constructing a building. The present invention encompasses the entire range of instructions involved in building construction.

FIG. 1 is a flow chart illustrating a process for approving an electronic specification according to an embodiment of the invention. At step 102, a system embodying the present invention is accessed by a user. Access to the system may be through any device which permits access. As will be described in greater detail below, access may be through a computer or terminal, such as a personal computer or a terminal with a display and input devices connected to a network. Other devices may also be used to access the system according to an embodiment of the invention.

At step 104, the system presents one or more parts to the user. At step 106, the system receives a selection of a part to review. A user may select from one or more parts that have information stored within the system. According to an embodiment of the invention, each part may have a file associated with that part, with information related to the part stored within the file. Files may be grouped according to various criteria, such as the end-product the part is used for, the type of part, or other groupings.

At step 108, the selected part is present to the user. Presentation of a selected part may comprise a 2D drawing, a 3D cut through model, a 3D solid model, or other depiction of the part. At step 110, a selection of a feature to review is received. According to an embodiment of the invention, a feature may be selected by selecting the feature displayed on the part. Selection may occur by manipulating a mouse to move a cursor over the feature, and selecting the feature through the mouse. Other manners of selecting features may also be used.

Figure 2:
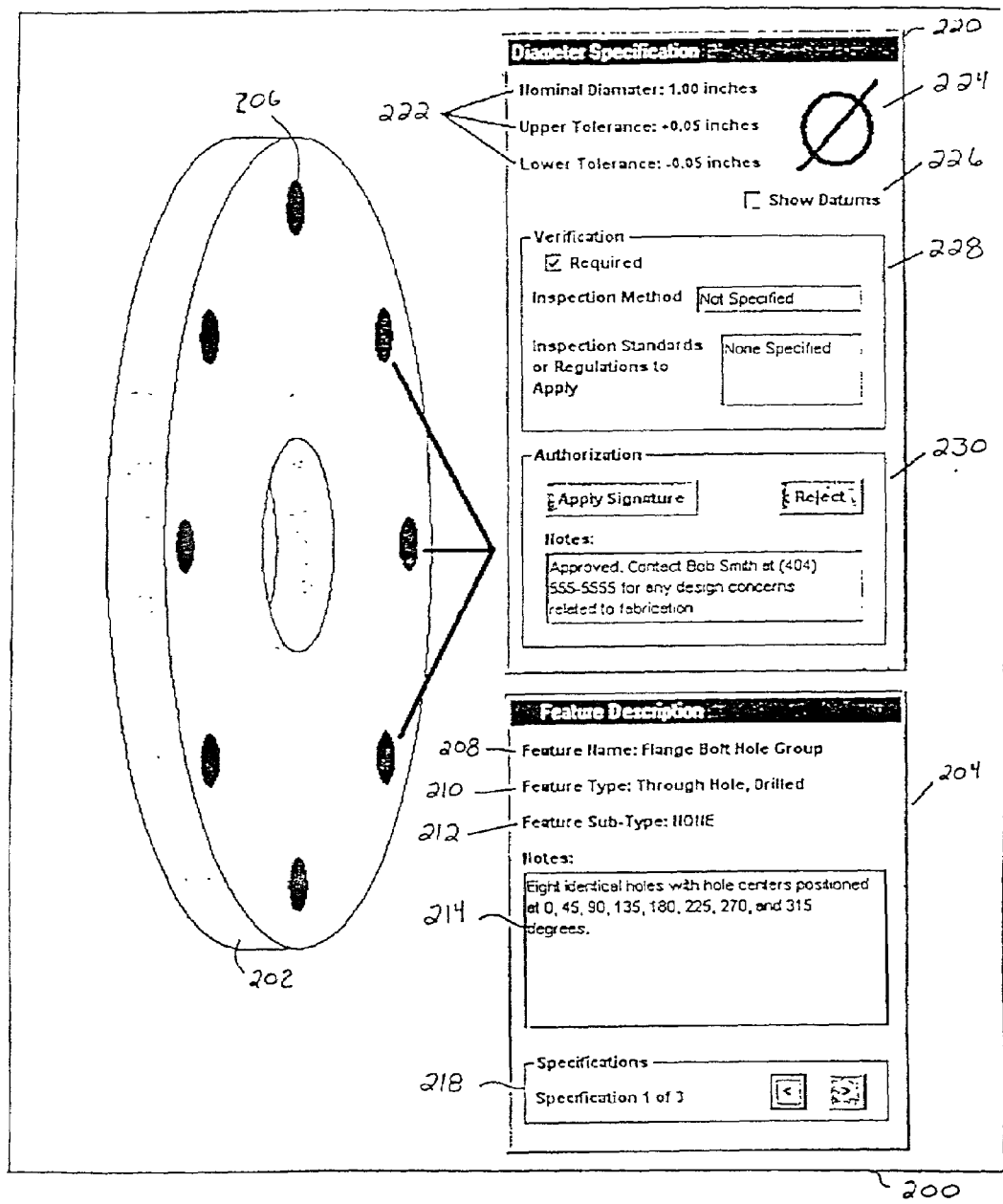
FIGS. 2, 3 and 4 illustrate a graphic user interface for displaying a part and related specifications according to an embodiment of the invention.

At step 112, a feature description panel is presented to a user. FIG. 2 is a graphic user interface 200 illustrating a part 202. A feature description panel 204 may be displayed when a feature is selected, such as selecting with a mouse device, a touch screen, a keyboard, or other selection device. According to an embodiment of the invention, features selected using a mouse click may be highlighted with a color that contrasts with other parts of the solid model. Feature description panel 204 may provide the name 208 given to the feature. According to an embodiment of the invention, the name may be descriptive so as to indicate its function in the design. In the example illustrated in FIG. 2, the feature description panel is associated with bolt holes 206 drilled into a flange as is indicated in the name. According to an embodiment of the invention, the eight bolt holes 206 may be of a different color (e.g., red) than the rest of part 202, thereby contrasting with the other features making up the model. While FIG. 2 provides an example of a specification for a part in heavy manufacturing, such as drilling metal, it is understood that the process and features of the present invention may be applicable to other fabrications, such as clothing, furniture, commercial structures, or anything that requires specifications for fabrication.

Further, feature description panel 204 may include a feature type 210, where a type identification is given to the selected feature. In the example illustrated in FIG. 2, hole 206 is a drilled, through hole. A feature type may be used to group files associated with various parts. Feature sub-type 212 may provide further descriptive information about the feature type. In the example of FIG. 2, since the information provided in feature type 210 is sufficient, no sub-type is given. However, feature sub-type 212 may allow greater detail to be included when required.

Feature description panel 204 may provide a notes section 214. In this example, notes section 214 is a text box where additional information can be associated with the highlighted features, complimenting the descriptive name assigned to the feature. By way of example, references to published manufacturing regulations and standards may be placed here. In this particular example, the notes tell the fabricator that there are a total of eight holes associated with this specification data panel and that they are to be equally spaced around the circumference of the flange. Very detailed, free-form information may be displayed, further assisting an understanding of the specifications of part 202.

According to an embodiment of the invention, feature description panel 204 may require a plurality of pages to completely describe the specifications of part 202. Specification navigation 218 permits a user to move within feature description panel 204. Specification navigation 218 may indicate the current page number of feature panel 204, the total pages, and allow the user to successively view each specification. Buttons within specification navigation 218 may permit a user to move to the specification page and to the previous specification page associated with the feature that is displayed.

Figure 3:
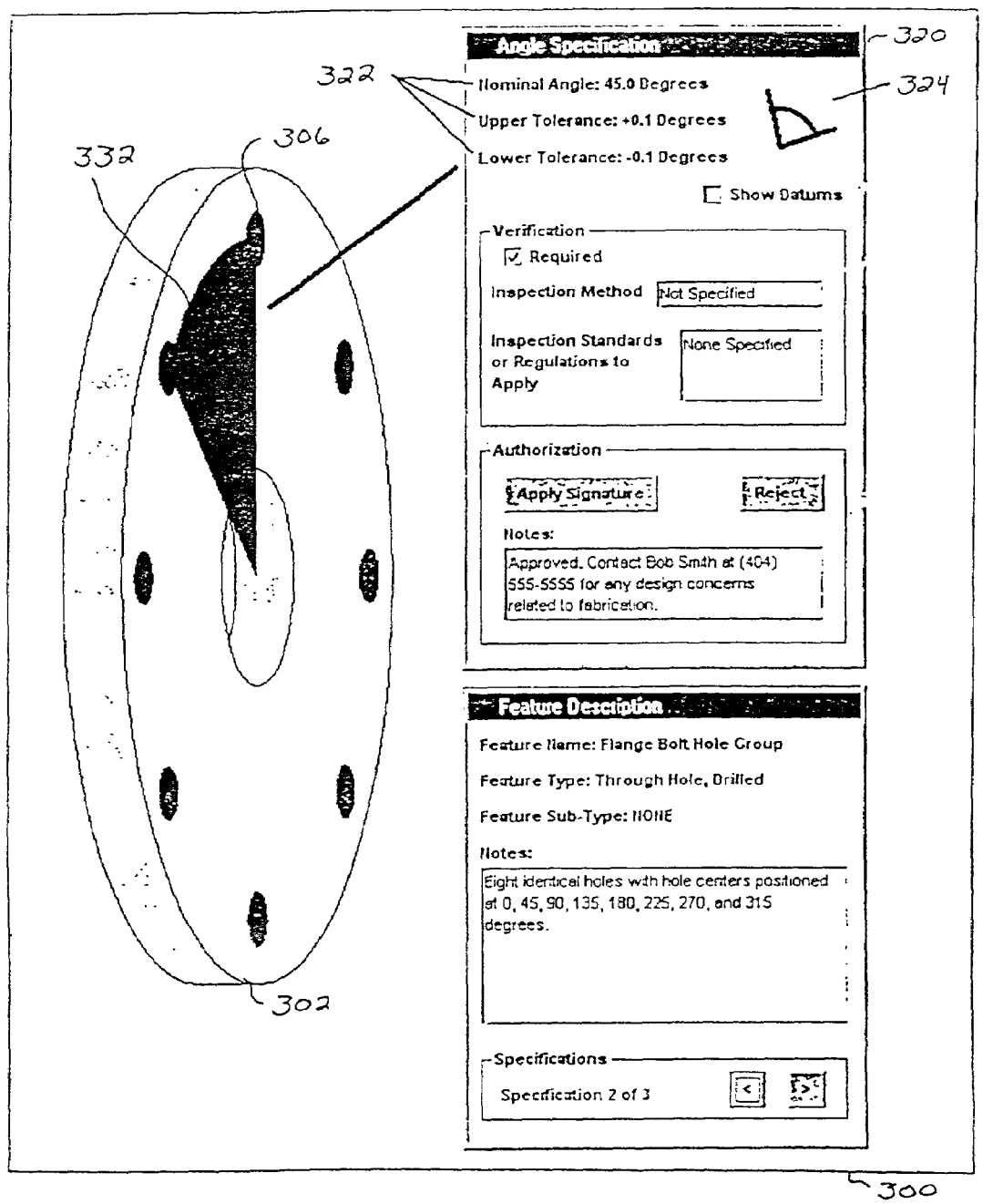
Figure 4:
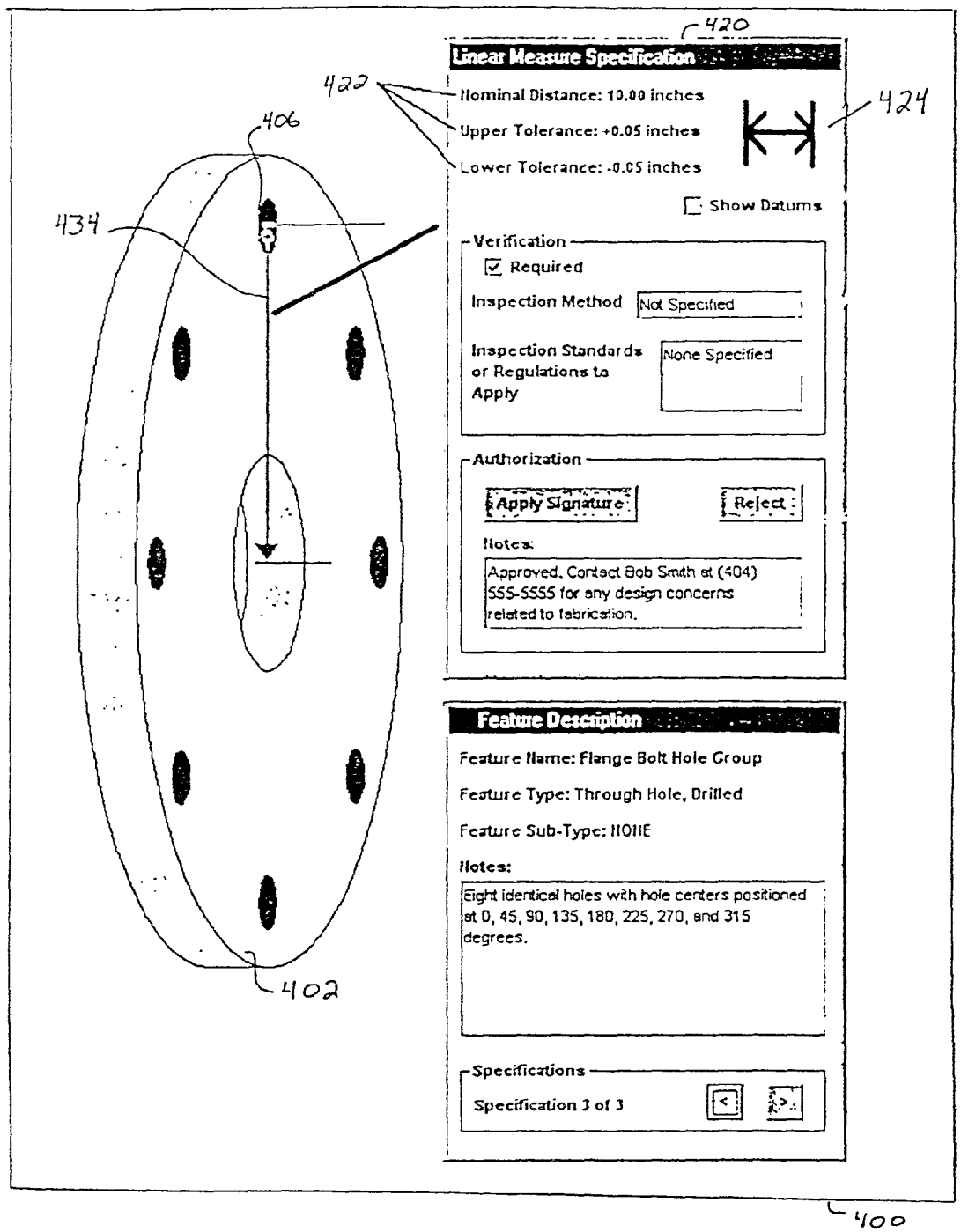

FIGS. 2, 3, and 4 illustrate an example of specification panels associated with a 3D solid model representation of a part to be sent to fabrication vendors for manufacture. By way of the present example, representations for every kind of specification described in the ASME Y14.5 standard and its ISO equivalent international standard. Graphic user interface 200 may also include a validation panel 220. Validation panel may include information for a user to review and accept the specification for part 202. Information section 222 may provide numerical information of importance to the fabrication vendor. In this particular example, it shows the nominal diameters of the holes and the allowable tolerance range. For these holes to be within specification, they may be no larger than 1.05 inches in diameter and no smaller than 0.95 inches in diameter. Symbol 224 displays the standard (ASME Y14.5) symbol for the specification associated with the highlighted feature. In this case it is the symbol for diameter. Inclusion of these standard symbols may provide a familiar indicator of the specification, leveraging the knowledge that many fabricators already possess.

Datum reference 226 provides a switch for turning datum references on and off. According to an embodiment of the invention, datum references are imaginary elements such as planes and points employed after fabrication is complete to verify that features have been fabricated to the tolerance specified. Verification frame 228 provides information regarding the verification requirements for a specification after fabrication. According to an embodiment of the invention, a fabrication vendor may be required to physically measure a feature to ensure that the specification is satisfied. In this example, the fabricator must measure the diameters of all eight hole to verify that they fall within the tolerance called out in the specification. The frame contains a checkbox that allows the approving authority to indicate whether verification is necessary. If it is, both inspection method and applicable standards and regulations may be indicated in the boxes shown.

Authorization frame 2230 provides a responsible approving authority with the ability to digitally sign off on each and every specification. According to an embodiment of the invention, as opposed to the current method where one signature is given to approve a single drawing containing a large number of specifications, a responsible party may be forced to approve or reject the specifications. Authorization frame 230 may have two buttons, such as a mouse or keyboard activated button. One button (e.g., an "Apply Signature" button) may associate a digital signature with the specification indicating the approval of the specification by the digital signature owner. A second button (e.g., a "Reject"

button) may allow the approving authority to indicate that the specification is wrong. According to an embodiment of the invention, an authorization frame may provide a mechanism for reducing errors in manufacturing specifications by forcing the approving authority to carefully consider each and every specification.

The example of FIG. 2 illustrates the information provided to a user with respect to the first page of the specifications associated with the selected features. FIG. 3 illustrates the information provided to a user with respect to the second page of the specifications associated with the selected features. For clarity of description, the last two digits of the references numbers from FIG. 2 have been used for corresponding features in FIG. 3. As such, graphic user interface 300 illustrates a part 302, where angle 332 between bolt holes 306 is described in the specification. Graphic user interface 300 also includes a validation panel 320. Validation panel may include information for a user to review and accept the specification for part 302. Information section 322 may provide numerical information of importance to the fabrication vendor. In this particular example, it shows the nominal angle and the allowable tolerance range. For this angle to be within specification, it may be no larger than 45.1 degrees and no smaller than 44.9 degrees. Symbol 324 displays the standard (ASME Y14.5) symbol for the specification associated with the highlighted feature. In this case it is the symbol for angle.

FIG. 4 illustrates the information provided to a user with respect to the third page of the specifications associated with the selected features. For clarity of description, the last two digits of the references numbers from FIG. 2 have been used for corresponding features in FIG. 4. As such, graphic user interface 400 illustrates a part 402, where a distance 434 between bolt holes 406 and the center of part 402 is described in the specification. Graphic user interface 400 may also include a validation panel 420. Validation panel may include information for a user to review and accept the specification for part 402. Information section 422 may provide numerical information of importance to the fabrication vendor. In this particular example, it shows the nominal distance between the center of bolt holes 406 and the center of part 402, and the allowable tolerance range. For these holes to be within specification, the center of bolt holes 406 may be no more than 10.05 inches from center of part 406 and no less than 9.95 from the center of part 406. Symbol 424 displays the standard (ASME Y14.5) symbol for the specification associated with the highlighted feature. In this case it is the symbol for distance. Inclusion of these standard symbols may provide a familiar indicator of the specification, leveraging the knowledge that many fabricators already possess. According to an embodiment of the invention, the final version of the specification may include examples for every specification described in ASME Y14.5 and its ISO equivalent.

Figure 5:
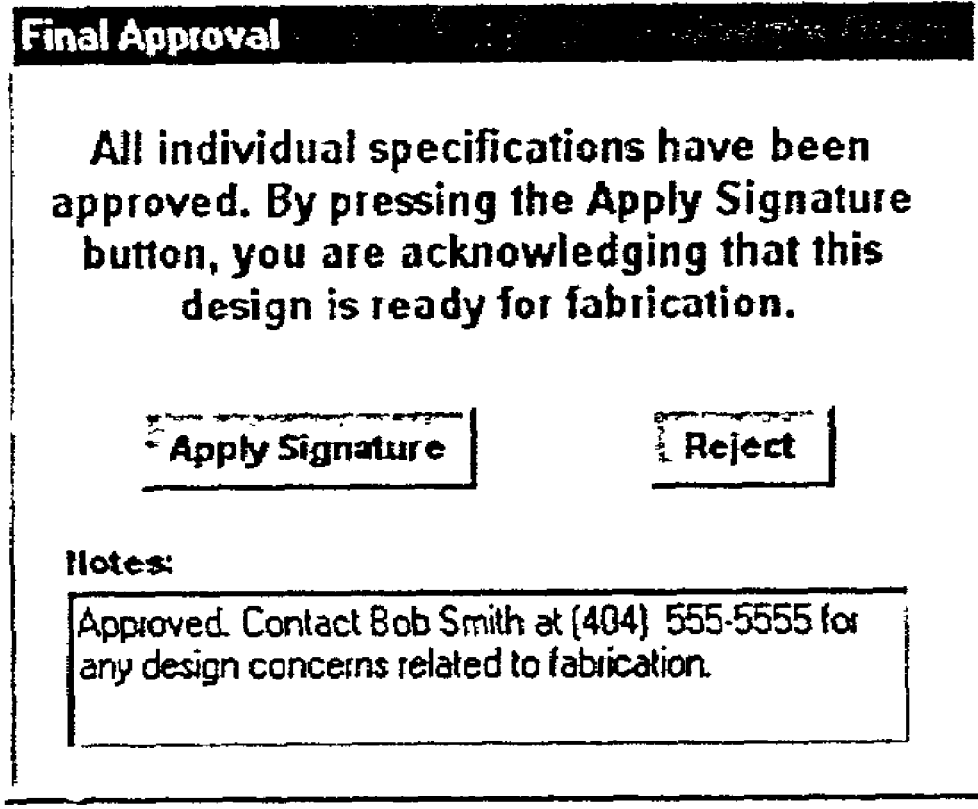
FIG. 5 illustrates a graphic user interface for final approval according to an embodiment of the invention.

FIG. 5 illustrates a final approval panel 500. When all specifications have a valid digital signature assigned, this panel is displayed and allows the user to either approve or reject the entire design represented by the 2D drawings and/or the 3D solid model. For the engineer responsible for approving the design, selecting 'Apply Signature' may be an acknowledgement that the design is ready for fabrication. For the fabrication vendor, it may be an acknowledgement that he/she has reviewed the entire design and understands the designer's intent as it relates to manufacture.

According to an embodiment of the invention, three software components may make up the solution of the present invention. A first software component may allow the specification information to be entered and associated with highlighted features. Such a software component may be used to create the specification panels as shown in the examples of FIGS. 2, 3 and 4. A second software component may allow the approving authority to view each specification associated with 3D solid model features and to assign a digital signature to each specification. Such a software component may be used to view the parts and the specification panels as shown in the examples of FIGS. 2, 3 and 4. A third software component may provide an interactive tool used by the fabrication vendor to view the specification data. According to an embodiment of the invention, its operation is nearly identical to the software component used by the approving authority. As with the other component, the fabricator tool has a button whereby a digital signature can be associated with the displayed specification. This digital signature may enable a fabricator to acknowledge that he or she understands the intent of the design specification and help ensure that the feature is produced as indicated.

Various supporting technologies may be used within the context of the present invention. According to an embodiment of the invention, the eDrawings system offered by SolidWorks, Inc. of Concord, Mass., may be enable 3D solid model design information to be sent as an e-mail attachment. The design is packaged as a hybrid entity made up of both a 3D solid model representation and a series of 2D views containing conventional specification information as in the common 2D paper drawings. According to an embodiment of the invention, a viewer software component tool may be integrated with the 3D/2D design information, thereby enabling the recipient of an eDrawing to view it without additional software. Additionally, digital signature technology may be obtained through companies such as RSA Security, whereby software components for including digital signature capability in systems such as the one proposed may be obtained.

In many manufacturing companies, any representation of a design, whether a 2D drawing or 3D solid model intended as a guide for fabrication, must be approved by a responsible engineer. In the case of 2D drawings, this may be done through the application of a hand written signature to an information block on each 2D drawing involved in the fabrication. For 3D models, a signature may be applied to printed documents that accompany the computer files containing the 3D solid model. In any case, some form of approval signature is used to assign responsibility for a design that is to be forwarded for fabrication. The present invention may enables the approval of 2D drawings and/or 3D models or drawings which are presented in an electric medium. Further, according to an embodiment of the invention, approval of various aspects of a specification for a part may be obtained, thereby reducing errors.

When the fabrication of any part or assembly is to be built by a business establishment that is not a part of the company producing the design, a business-to-business legal contract is often formed between the company owning the design and the company selected to fabricate the part or assembly represented by the design. A portion of the contract may include the package of 2D drawings and or 3D solid models defining the design. As mentioned above, these 2D or 3D representations contain specifications of the part to be fabricated. Often, the contract will specify that the fabrication company is responsible for meeting the requirements spelled out in the 2D drawings and or 3D solid models. According to an embodiment of the invention, a fabricator, through the use of the present invention, may be required to approve each specification for a contract, thereby helping to ensure that the fabricator is familiar will all the specification for the part.

When any specification is defined, some mechanism may be employed to verify through measurement that the one or more particular specifications have been satisfied once all fabrication processes are complete. A contract between the design company and the fabrication company may state which party is responsible for verifying specifications. According to an embodiment of the invention, verification of measurements, through the system and process of the present invention, may help ensure that fabrication occurs according to the specifications detailed in the contract, thereby assisting in the business-to-business contract development activity in the manufacturing outsourcing environment.

In many cases, a part or assembly may undergo a number of different fabrication processes that may or may not be performed by the same fabrication vendor. By way of one example, parts that are coated after being cast or machined. A part machined by one company may be plated with chromium by a company that specializes in electroplating. Coordination of such activity is usually done by the primary fabricator. The contracting design company however, has the greatest interest in the success of any coordination activity and may specify in contractual arrangements how such activity is to be managed. According to an embodiment of the invention, specifications for one or more parts may be forwarded to each fabricator involved in a part. As each fabricator performs their activity associated with the part, that fabricator can review and validate the applicable portion of the specification, perform the activity, and measure the part to ensure that they have fully complied with the specifications.

Figure 6:
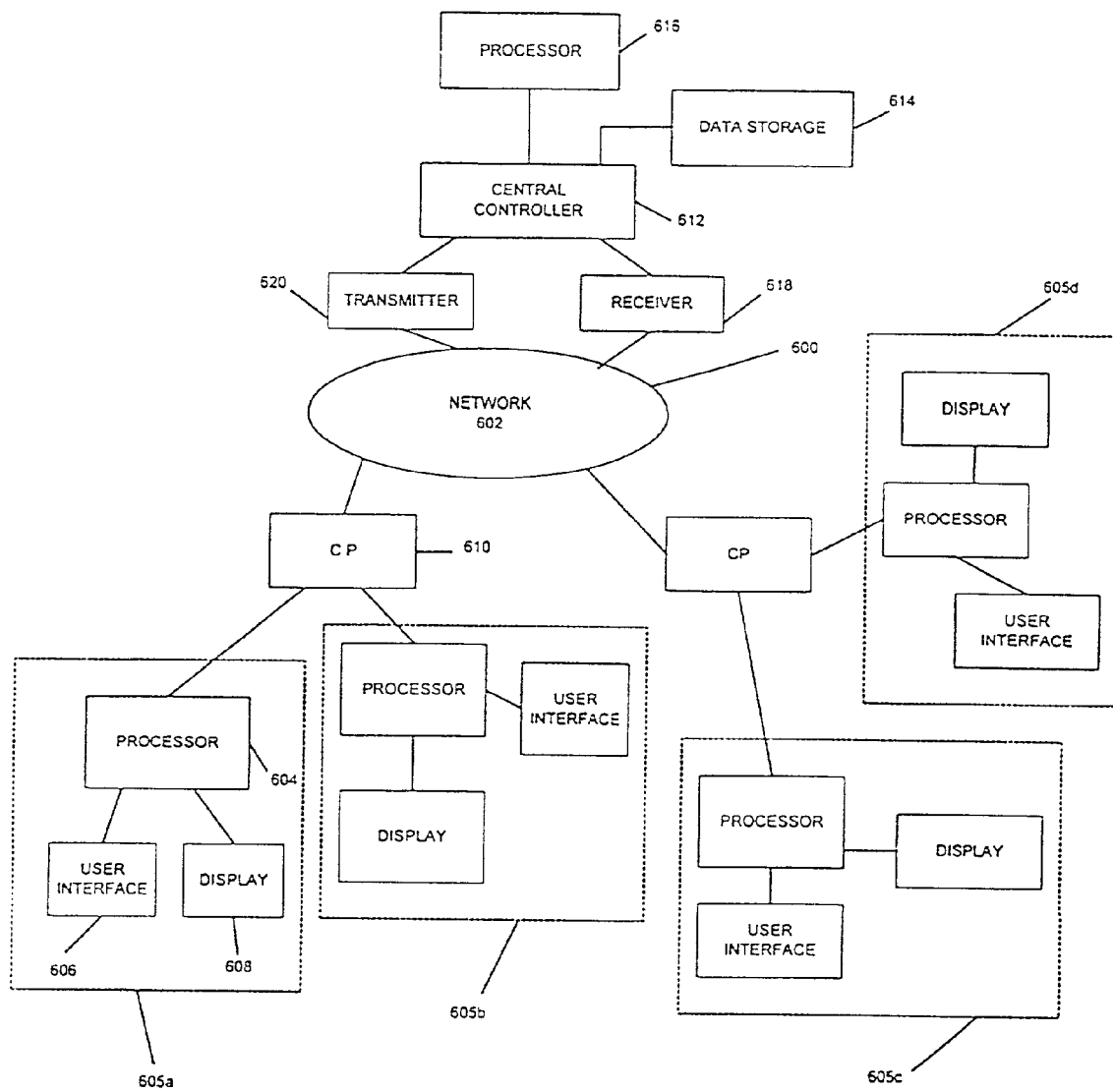
FIG. 6 illustrates a system for reviewing and validating specifications according to an embodiment of the invention.

FIG. 6 illustrates a system 600 according to an embodiment of the present invention. The system 600 comprises a plurality of computer devices 605 (or "computers") used by a plurality of users to connect to a network 602 through a plurality of connector providers (CPs) 610. The network 602 may be any network that permits multiple computers to connect and interact. According to an embodiment of the invention, the network 602 may be comprised of a dedicated line to connect the plurality of the users, such as the Internet, an intranet, a local area network (LAN), a wide area network (WAN), a wireless network, or other type of network. Each of the CPs 610 may be a provider that connects the users to the network 602. For example, the CP 610 may be an Internet service provider (ISP), a dial-up access means, such as a modem, or other manner of connecting to the network 602. In actual practice, there may be significantly more users connected to the system 600 than shown in FIG. 6. This would mean that there would be additional users who are connected through the same CPs 610 shown or through another CP 610. Nevertheless, for purposes of illustration, the discussion will presume three computer devices 605 are connected to the network 602 through two CPs 610.

According to an embodiment of the invention, the computer devices 605a–605c may each make use of any device (e.g., a computer, a wireless telephone, a personal digital assistant, etc.) capable of accessing the network 602 through the CP 610. Alternatively, some or all of the computer devices 605a–605c may access the network 602 through a direct connection, such as a T1 line, or similar connection. FIG. 6 shows the three computer devices 605a–605c, each having a connection to the network 602 through the CP 610a and the CP 610b. The computer devices 605a–605c may each make use of a personal computer such as a computer located in a user's home, or may use other devices which allow the user to access and interact with others on the network 602. A central controller module 612 may also have a connection to the network 602 as described above. The central controller module 612 may communicate with one or more data storage modules 614 discussed in more detail below.

Each of the computer devices 605a–605c used may contain a processor module 604, a display module 6022, and a user interface module 606. Each of the computer devices 605a–605c may have at least one user interface module 606 for interacting and controlling the computer. The user interface module 606 may be comprised of one or more of a keyboard, a joystick, a touch pad, a mouse, a scanner or any similar device or combination of devices. Each of the computers 605a–605c may also include a display module 622, such as a CRT display or other device. According to an embodiment of the invention, a developer, a user of a production system 634, and/or a change management module may use a computer device 605.

The central controller module 612 may maintain a connection to the network 602 such as through a transmitter module 614 and a receiver module 616. The transmitter module 614 and the receiver module 616 may be comprised of conventional devices which enable the central controller module 612 to interact with the network 602. According to an embodiment of the invention, the transmitter module 614 and the receiver module 616 may be integral with the central controller module 612. According to another embodiment of the invention, the transmitter module 614 and the receiver module 616 may be portions of one connection device. The connection to the network 602 by the central controller module 612 and the computer devices 605 may be a high speed, large bandwidth connection, such as though a T1 or a T3 line, a cable connection, a telephone line connection, a DSL connection, or another similar type of connection. The central controller module 612 functions to permit the computer devices 605a–605c to interact with each other in connection with various applications, messaging services and other services which may be provided through the system 600.

The central controller module 612 preferably comprises either a single server computer or a plurality of multiple server computers configured to appear to the computer devices 605a–605c as a single resource. The central controller module 612 communicates with a number of modules. Each module will now be described in greater detail.

A processor module 622 may be responsible for carrying out processing within the system 600. According to an embodiment of the invention, the processor module 622 may handle high level processing, and may comprise a math co-processor or other processing devices.

Data may be stored in a data storage module 636. The data storage module 636 stores a plurality of digital files. According to an embodiment of the invention, a plurality of data storage modules 636 may be used and located on one or more data storage devices, where the data storage devices are combined or separate from the controller module 612. One or more data storage modules 636 may also be used to archive information.

While the system 600 of FIG. 6 discloses the requester device 605 connected to the network 602, it should be understood that a personal digital assistant ("PDA"), a mobile telephone, a television, or another device that permits access to the network 602 may be used to arrive at the system of the present invention.

According to another embodiment of the invention, a computer-usable and writeable medium having a plurality of computer readable program code stored therein may be provided for practicing the process of the present invention. The process and system of the present invention may be implemented within a variety of operating systems, such as a Windows® operating system, various versions of a Unix-based operating system (e.g., a Hewlett Packard, a Red Hat, or a Linux version of a Unix-based operating system), or various versions of an AS/400-based operating system. For example, the computer-usable and writeable medium may be comprised of a CD ROM, a floppy disk, a hard disk, or any other computer-usable medium. One or more of the components of the system 2200 may comprise computer readable program code in the form of functional instructions stored in the computer-usable medium such that when the computer-usable medium is installed on the system 2200, those components cause the system 2200 to perform the functions described. The computer readable program code for the present invention may also be bundled with other computer readable program software.

According to one embodiment, the central controller module 612, the transmitter module 614, the receiver module 616, the processor module 622, and data storage module 636 may each comprise computer-readable code that, when installed on a computer, performs the functions described above. Also, only some of the components may be provided in computer-readable code.

Additionally, various entities and combinations of entities may employ a computer to implement the components performing the above described functions. According to an embodiment of the invention, the computer may be a standard computer comprising an input device, an output device, a processor device, and a data storage device. According to other embodiments of the invention, various components may be computers in different departments within the same corporation or entity. Other computer configurations may also be used. According to another embodiment of the invention, various components may be separate entities such as corporations or limited liability companies. Other embodiments, in compliance with applicable laws and regulations, may also be used.

According to one specific embodiment of the present invention, the system may comprise components of a software system. The system may operate on a network and may be connected to other systems sharing a common database. Other hardware arrangements may also be provided.

Figure 7:
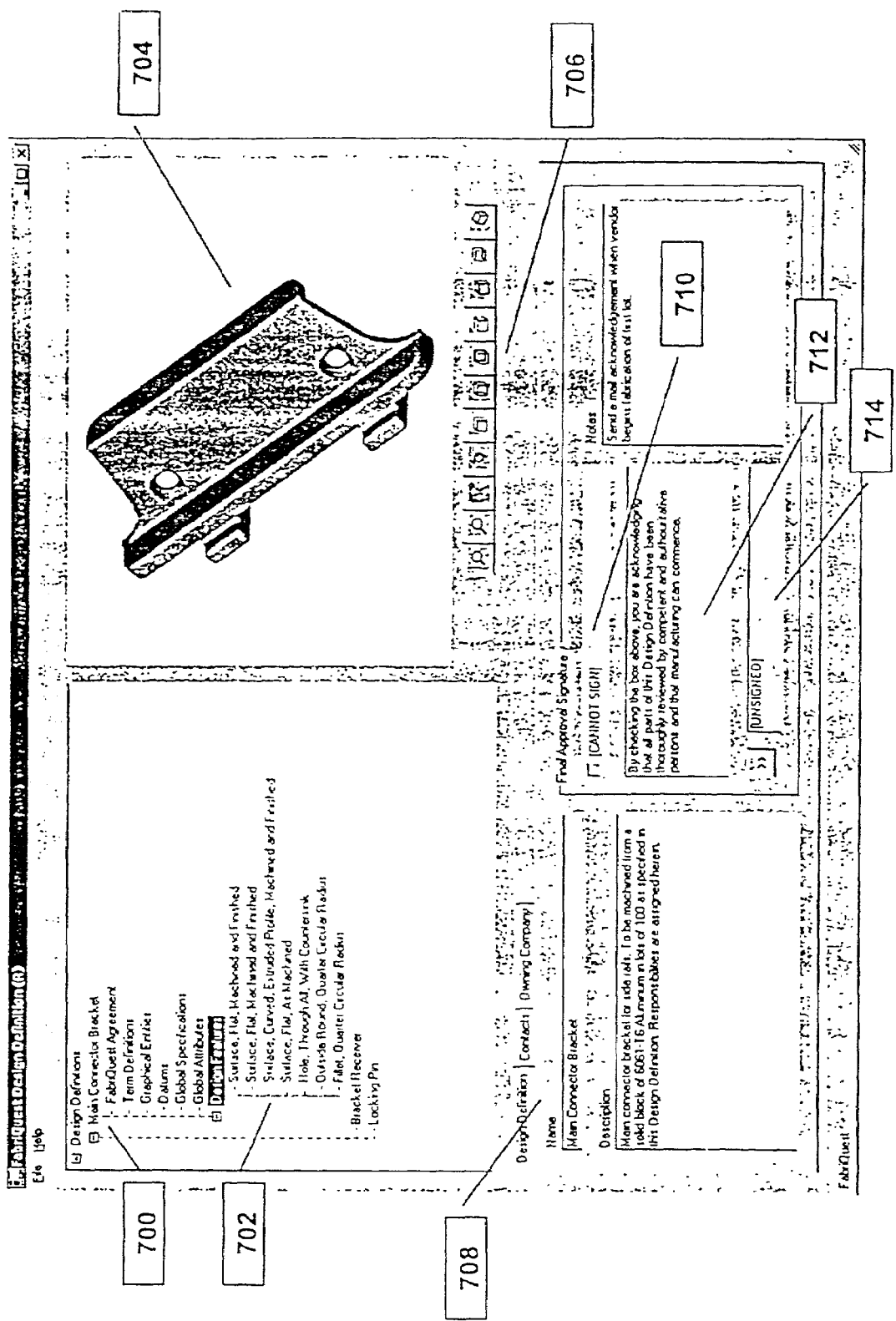
Figure 9:
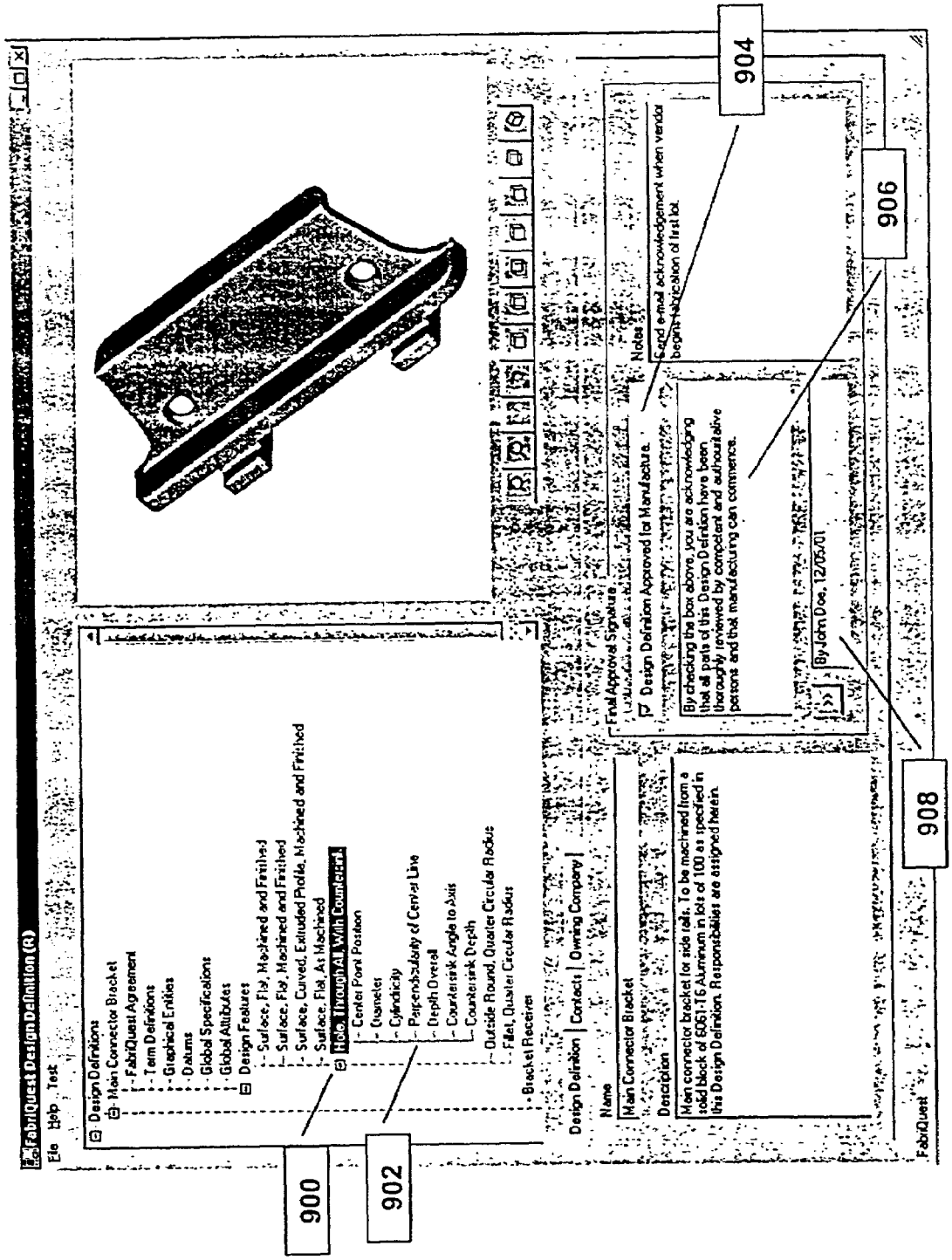

FIGS. 7, 8, and 9 show the main user interface screen used by a designer to approve the electronic design representation according to an embodiment of the invention. FIGS. 10–17 illustrate a graphic user interface for displaying a feature specification associated with a design feature selected in the 3D graphic representation of the part displayed on the main user interface screen according to an embodiment of the invention. While the example described in FIGS. 7–17 describe specific features of the present invention, it is understood that other features may be used, or that some features may be excluded from various embodiments of the invention.

The graphic user interface of FIG. 7 displays a maim screen. In this example of an embodiment of the invention, a 3D representation 704 of a part is named in the tree structure 700 as 'Main Connector Bracket'. The complete design representation, referred to as a 'Design Definition' in this embodiment, is made up of several components displayed in the tree structure 702. The tree branch labeled 'Design Features' is shown in 702 as expanded with each of the items below the branch representing a specific design feature that is mapped to one or more 3D graphical sub-components (surfaces in this embodiment) in the 3D model 704. The 3D graphical model 704 may be manipulated using the controls 706. The model may be rotated, moved within the confining window, zoomed in and out, and otherwise manipulated.

According to an embodiment of the invention, the text in each label in the tree view 702 may be colored (e.g., either green or red). By way of example, green signifies that the design element represented by the branch has been reviewed and digitally signed by an authorized signatory, while red signifies that the corresponding design element has not been digitally signed. Other colors or designations may also be used.

When the top-level tree branch 700 is selected, descriptive information about the Design represented by the 3-dimensional model 704 is displayed in the 'Design Definition' panel 708. This panel also contains the final digital signature check box 710 whereby the authorizing signatory approves the entire contents of the Design Definition including the 3D representation 704 and all design specifications associated therewith 702. A legal notice 712 explains the legal meaning of affixing a digital signature by checking the signature box 710. A box 714 displays the name of the authorizing signatory and the date of signature once the signature box 710 is checked. When the signature box 710 is checked, a timestamp is sent to the server hosting the system so that the signature is recorded. Additionally, the database server is updated with the identity of the signatory so that the signature record is complete.

In FIG. 7, the text to the right of the signature check box 710 reads '[CANNOT SIGN]'. By way of this example, this is because some of the design elements 702 associated with the 'Main Connector Bracket' Design Definition 700, 704 are not yet signed. This embodiment of the invention will not permit a digital signature to be applied until all sub-signatures have been applied. This forces the authorized signatory to review each and every key design element before affixing a final signature.

FIG. 8 a design feature, 'Hole, Through All, With Countersink', that has been selected in the tree view 800. When the selection is made, the corresponding components of the 3D model 802 become highlighted so as to inform the user of the correlation between the design feature in the tree view 800 and its graphical representation within the 3D model 802.

A list of specifications is associated with the selected design feature 800. In this embodiment of the invention, some specifications are shown in green text and others are in red text. The text coloring signifies whether or not the specification has been digitally signed by an authorized signatory. In addition to the highlighting, this embodiment of the invention automatically moves the 3D model 802 into the proper position for viewing the highlighted design feature representations when a design feature is selected in the tree view 800. Furthermore, the user may interact with the 3D model and select graphical sub-components. If a selected graphical subcomponent represents a design feature, the corresponding branch in the tree view 800 is selected and expanded so that the specification list associated with the design feature is visible.

In this embodiment of the invention, when a specification associated with a design feature 800 is selected in the tree view, the 'Feature Specification Screen' is displayed. This aspect of this embodiment of the invention will be described in greater detail below with respect to FIGS. 10–17.

In this embodiment of the invention, FIG. 9 illustrates the selected Design Definition which may be approved only when each and every subcomponent 900, 902 has been digitally signed. Final approval of the selected Design Definition occurs when an authorized signatory checks the signature box 904. A legal notice 906 informs the signatory of the significance of the signature. In this embodiment of the invention, when the signature box 804 is checked, a message is sent to the server hosting the system updating the central database with a timestamp and the identity of the signatory. Once the digital signature has been affixed and accepted at the server, the name of the signatory and the signature date is displayed in a box 908.

Figure 10:
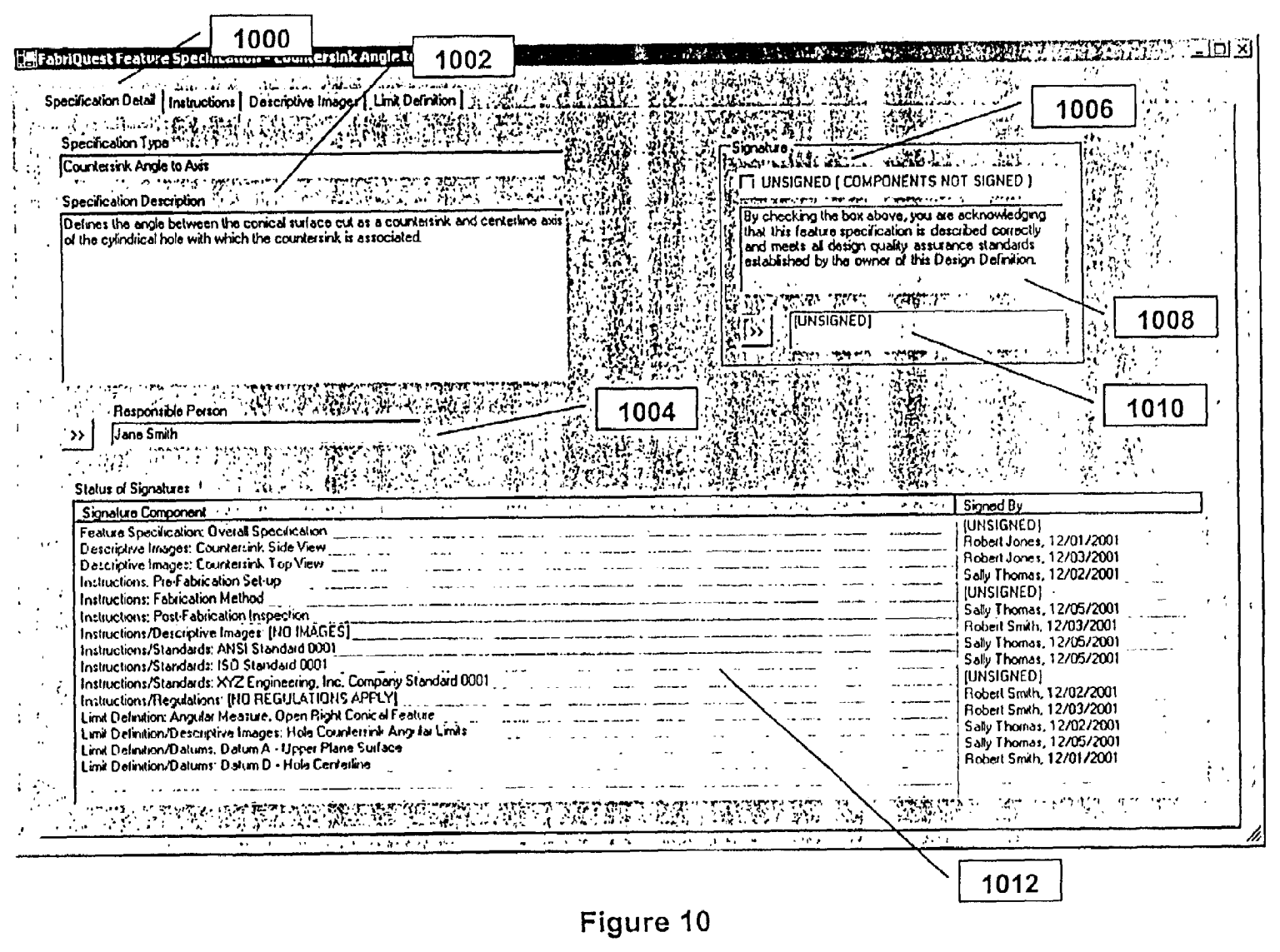

FIG. 10 illustrates a feature specification screen for a specification detail according to an embodiment of the invention. In this embodiment of the invention, digital signatures are required for a number of key elements that make up a properly defined feature specification. FIG. 10 shows the 'Specification Detail' panel 1000 which displays the name and description of the specification 1002, the name of the person responsible for defining the specification 1004, a digital signature check box 1006, a legal notice explaining the legal meaning of the signature 1008, and a box 1010 containing the name of the signatory and the date of signature. As described earlier, a message containing the identity of the signer and that date of signature is sent to the server when the signature box 1006 is checked.

In this example of this embodiment of the invention, the signature check box 1006 reads 'UNSIGNED (COMPONENTS NOT SIGNED)'. This indicates that one or more key subelements of the specification have not been signed, thus preventing the application of a final approval signature. The Specification Detail panel 1000 contains a 'Status of Signatures' list 1012 of all elements within the current specification that require a signature, a color code indicating whether or not the listed item has been signed, and if the element is signed, the name of the signer and the date of signature. As described earlier, elements listed in green text signify that a signature has been applied and red indicates that the element remains unsigned.

In this example of this embodiment of the invention, the list 1012 shows that two subcomponents, 'Instructions: Fabrication Method', and 'Instructions/Standards: XYZ Engineering, Inc. Company Standard 0001' are listed in red text indicating that they have not been signed. This is why the text to the left of the specification signature box 1006 reads 'UNSIGNED (COMPONENTS NOT SIGNED)'.

Figure 11:
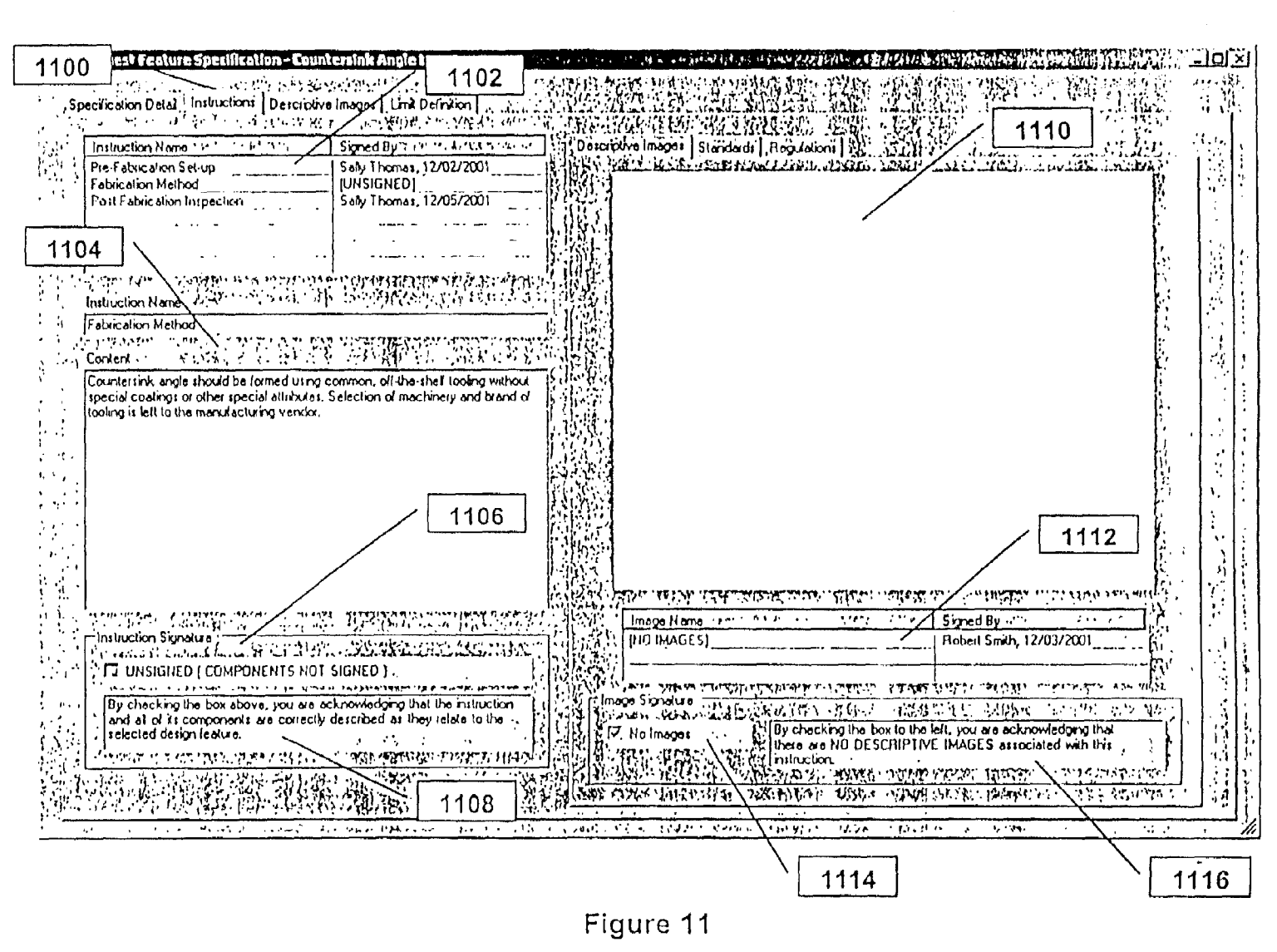

FIG. 11 illustrates a feature specification screen including instructions and instruction description images. In this example of this embodiment of the invention, a feature specification may have one or more instructions assigned. These are instructions directed to the manufacturer of the part and may define any number of requirements imposed by the designer or the part or the creator of the Design Definition. The 'Instructions" panel 1100 contains a list 1102 of one or more instructions associated with the parent feature specification, details of a selected instruction including the name and basic text content of the instruction 1104, a signature check box 1106, and a legal notice indicating the legal meaning of the digital signature 1108. As described earlier, the instruction list 1102 is color-coded. Green text indicates that the instruction and all of its subcomponents have been digitally signed. Red text indicates that the instruction or one or more of its subcomponents have not yet been signed. For each instruction in the list 1102 that has been signed, the name of the signatory and the date of the signature is displayed.

For this embodiment of the invention, one or more descriptive images may be associated with each instruction listed in 1102. The 'Descriptive Images' panel contains an image box 1110 for displaying an image, a list of image names 1112, a signature check box 1114, and a legal notice 1116 describing the legal meaning of the digital signature. As explained previously, the list of images 1112 is color-coded in green and red text.

Figure 12:
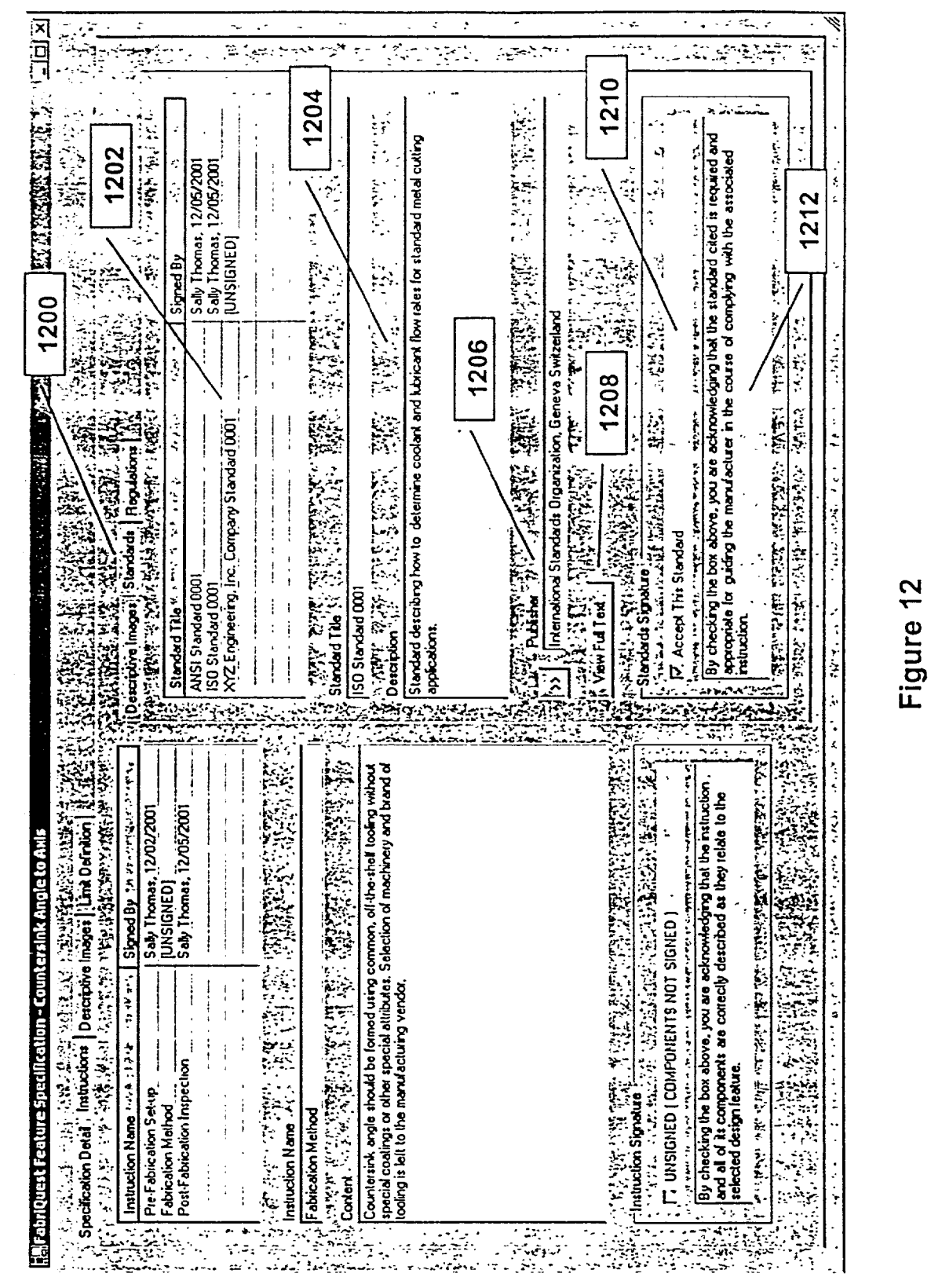

FIG. 12 illustrates a feature specification screen, including instruction standards. In this example of this embodiment of the invention, an instruction may have one or more standards assigned. These are standards used to enforce uniformity manufacturing processes. The 'Standards' panel 1200 contains a list 1202 of one or more standards associated with the parent instruction, details of a selected standard including its name and description 1204, the name of the publisher of the standard 1206, a button 1208 that, when activated, launches a screen showing the full text of the selected standard, a signature check box 1210, and a legal notice describing the legal meaning of the digital signature 1212). The standards list 1202 is color-coded. Green text indicates that the standard has been digitally signed. Red text indicates that the standard has not been signed. For each standard in the list 1202 that has been signed, the name of the signatory and the date of the signature has been displayed.

Figure 13:
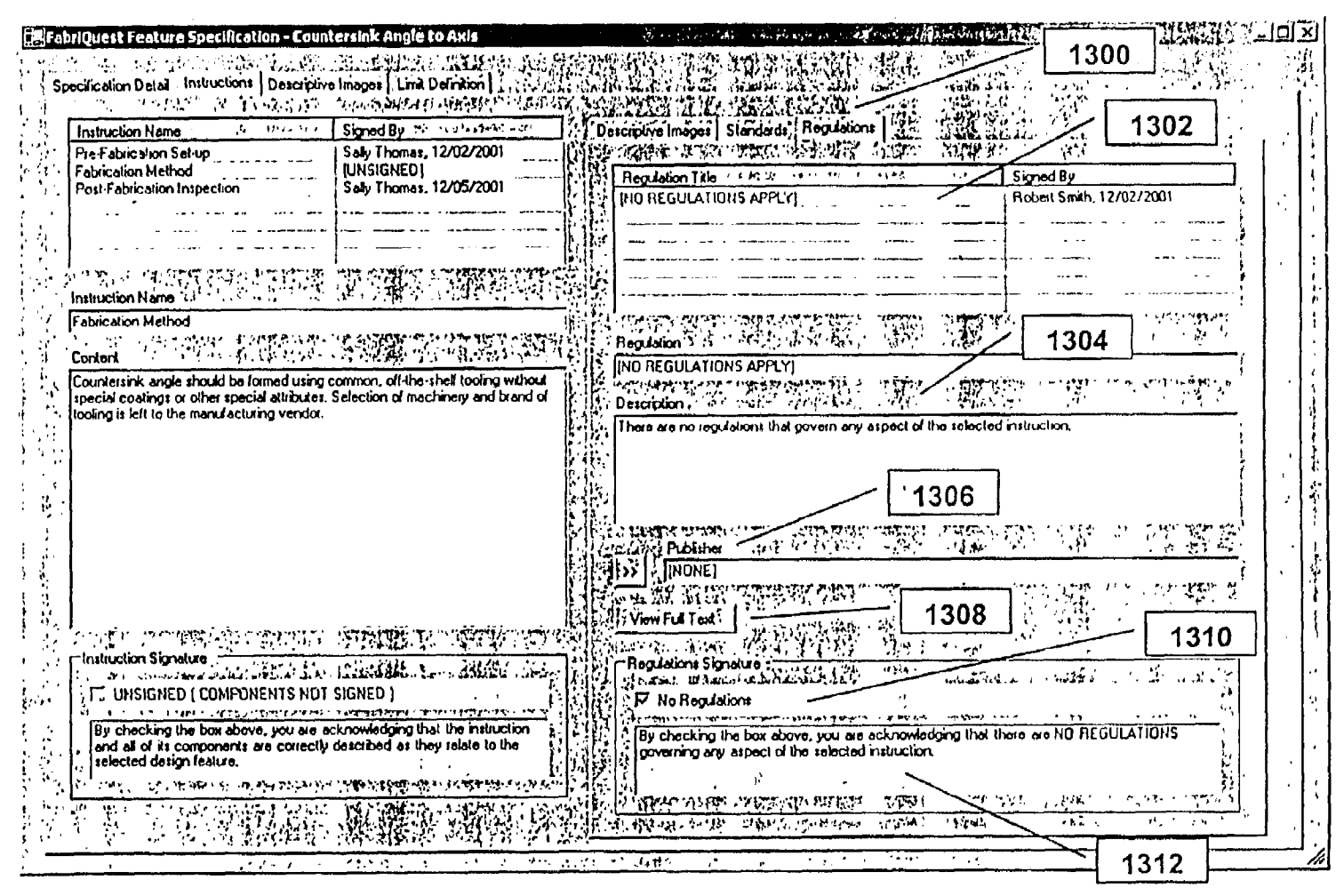

FIG. 13 illustrates a feature specification screen, including instruction regulations. In this example of this embodiment of the invention, an instruction may have one or more regulations assigned. These are regulations established and enforced by government agencies that must be followed by a manufacturer of the part. The 'Regulations' panel 1300 contains a list 1302 of one or more regulations associated with the parent instruction, details of a selected regulation including its name and description 1304, the name of the publisher of the regulation 1306, a button 1308 that, when activated, launches a screen showing the full text of the selected regulation, a signature check box 1310, and a legal notice describing the legal meaning of the digital signature 1312. The regulations list 1302 is color-coded. Green text indicates that the regulation has been digitally signed. Red text indicates that the regulation has not been signed. For each regulation in the list 1302 that has been signed, the name of the signatory and the date of signature is displayed.

Figure 14:
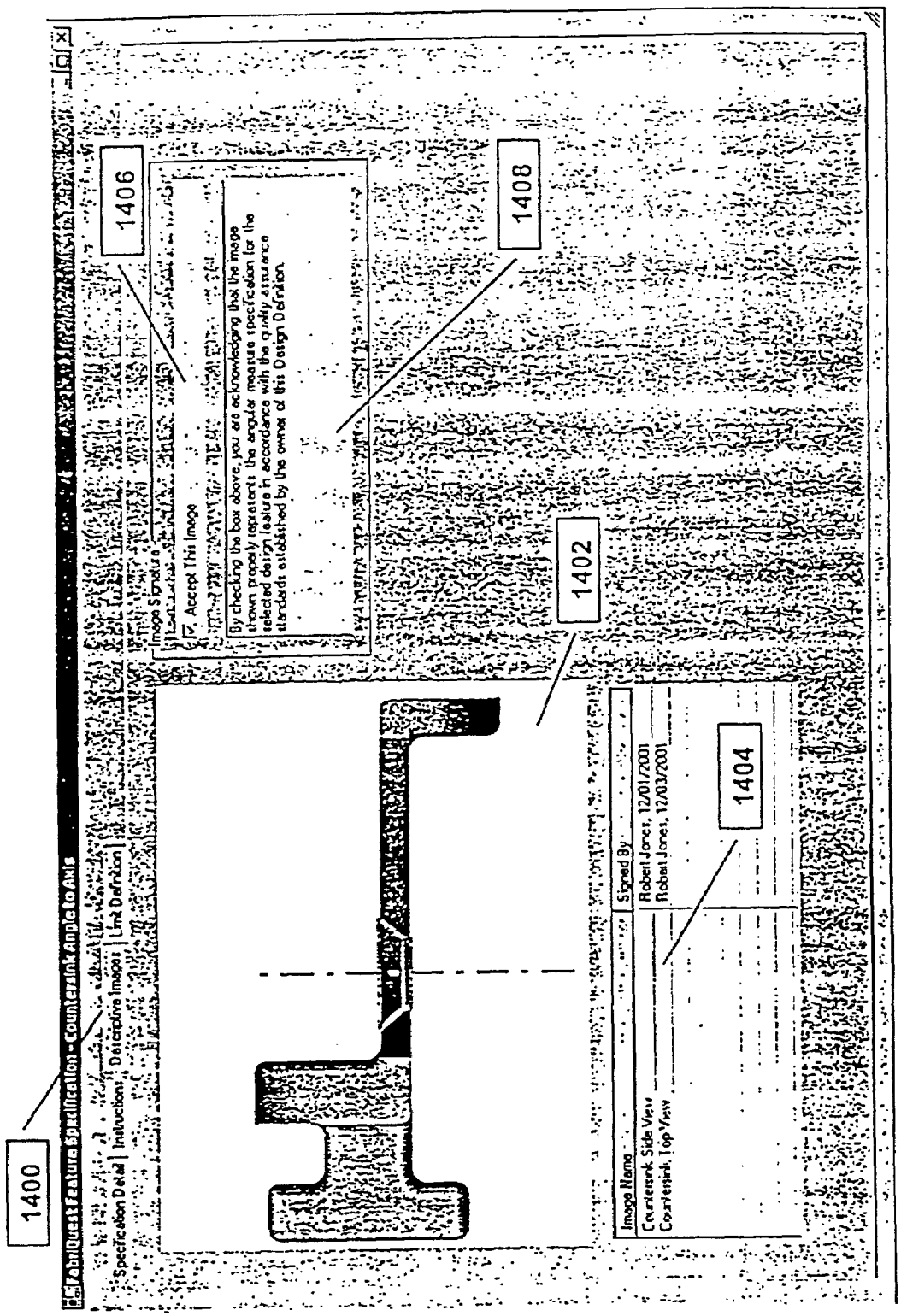

FIG. 14 illustrates a feature specification screen, including descriptive images. For this embodiment of the invention, one or more descriptive images may be associated with a feature specification. The 'Descriptive Images' panel 1400 on the main 'Feature Specification' screen contains an image box 1402 for displaying an image, a list of image names 1404, a signature check box 1406, and a legal notice 1408 describing the legal meaning of the digital signature. The list of images 1404 is color-coded in green and red text. Green text indicates that the image has been digitally signed. Red text indicates that the image has not been signed. For each image in the list 1404 that has been signed, the name of the signatory and the date of signature is displayed.

Figure 15:
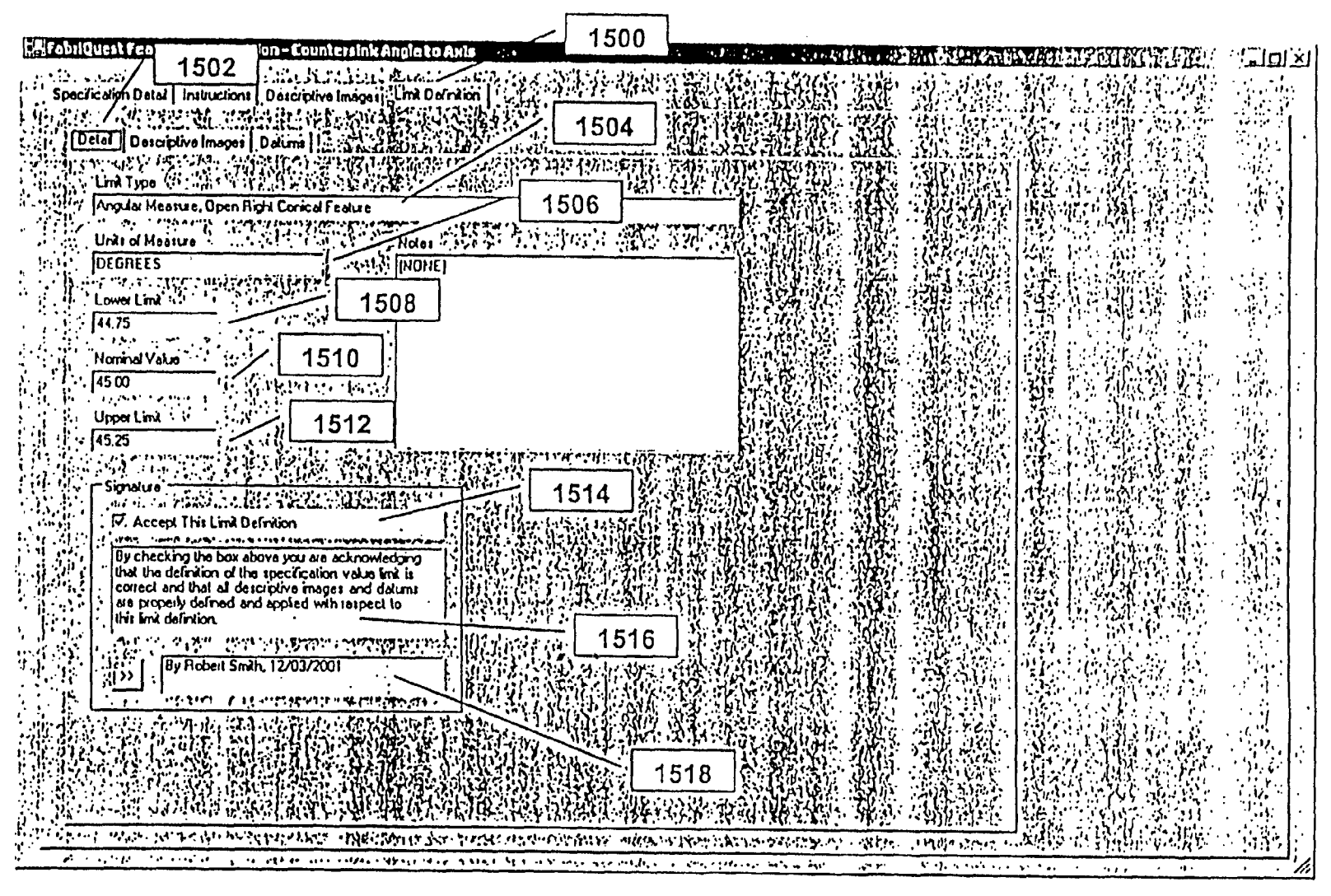

FIG. 15 illustrates a feature specification screen including a limit definition detail. For this embodiment of the invention, a limit definition may be associated with a feature specification. When a feature specification involves an aspect of the design having measurable numeric value such as a length or angle, then a range must be given so that the natural variation in the physical parameter may be accounted for. The 'Limit Definition' panel 1500 contains a series of panels containing information about the Limit Definition associated with the parent Feature Specification. The 'Detail' panel 1502 contains the Limit Type 1504, the units of measure for the limit values 1506, the lower, nominal, and upper limit values 1508, 1510, 1512, a signature check box 1514, a legal notice explaining the meaning of the signature 1516, and a box 1518 containing the name of the signer and the date of signature.

Figure 16:
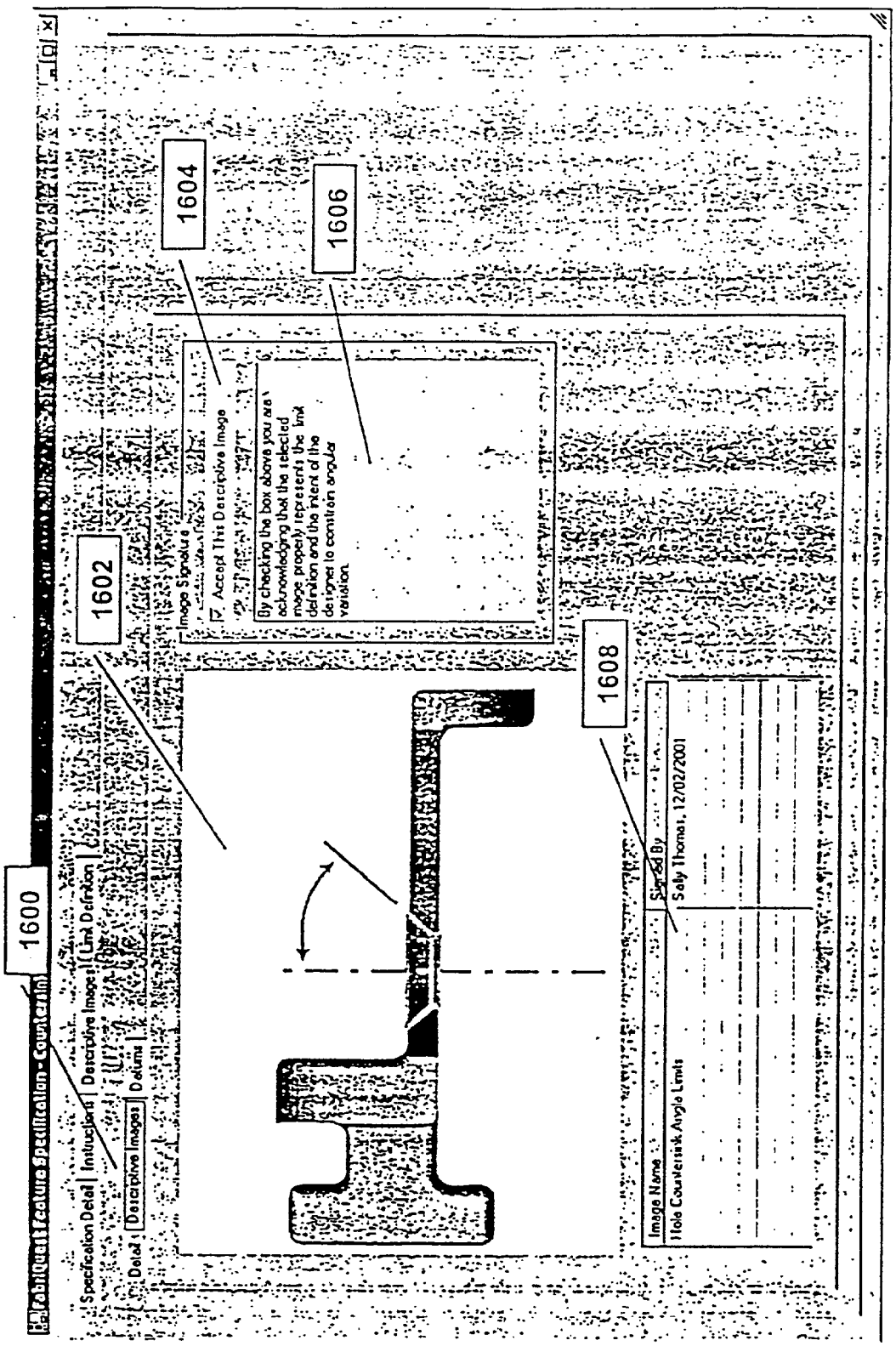

FIG. 16 illustrates a feature specification screen including limit definition descriptive images. For this embodiment of the invention, one or more descriptive images may be associated with a limit definition. The 'Descriptive Images' panel 1600 on the main 'Limit Definition' panel contains an image box 1602 for displaying an image, a list of image names 1608, a signature check box 1604, and a legal notice 1606 describing the legal meaning of the digital signature. The list of images 1608 is color-coded in green and red text. Green text indicates that the image has been digitally signed. Red text indicates that the image has not been signed. For each image in the list 1608 that has been signed, the name of the signatory and the date of signature is displayed.

Figure 17:
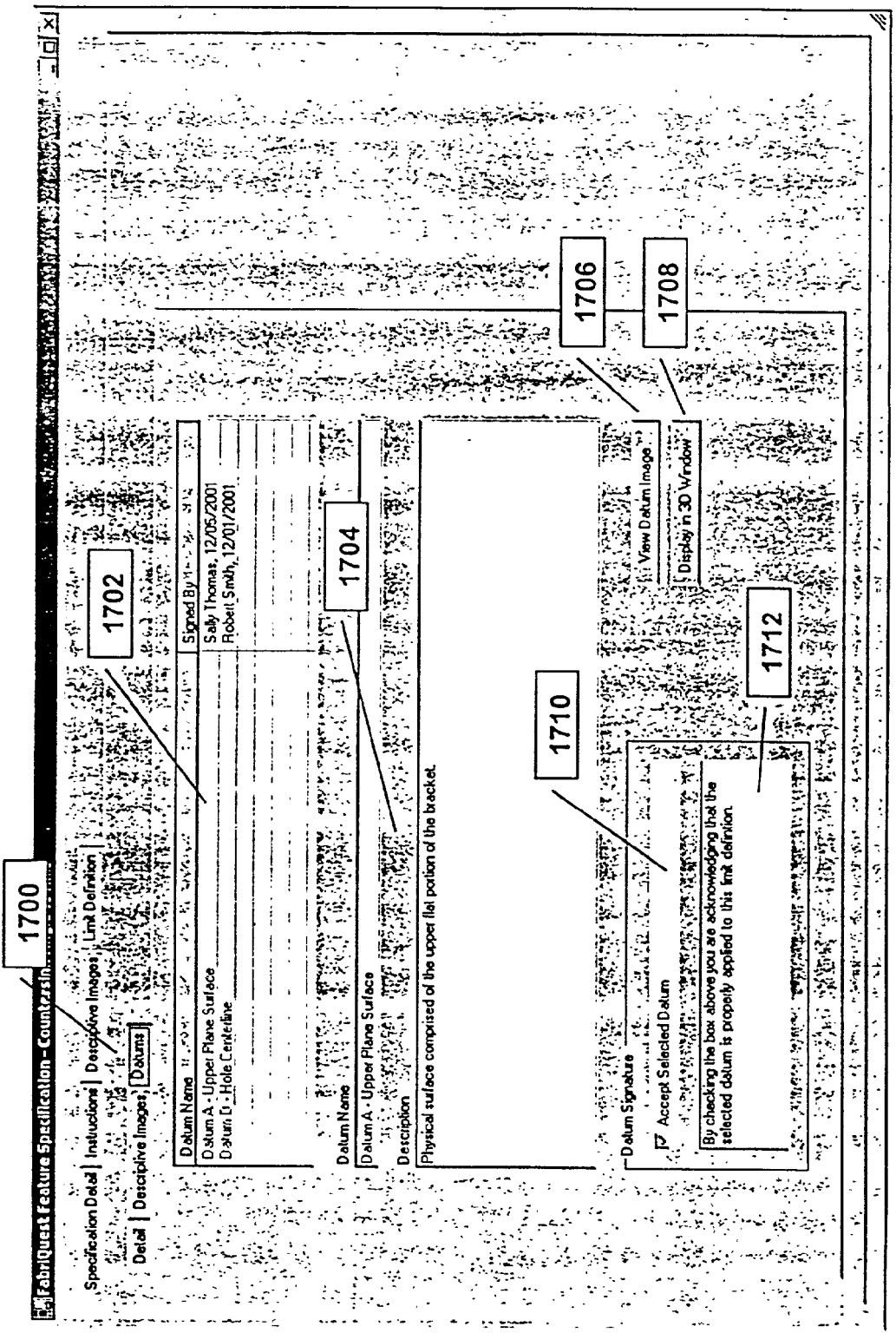

FIG. 17 illustrates a feature specification screen, including limit definition datums. For this embodiment of the invention, one or more datums may be associated with a limit definition. A datum is used as a reference for verifying that its associated limit definition value falls within the specified upper and lower limits. The 'Datums' panel 1700 contains a list 1702 of datums, the name and description 1704 of the datum selected from the list, a button 1706 that, when activated, displays a graphical image illustrating the application of the datum, a button 1708 that, when activated, displays a 3-dimensional representation of the datum in the 3D display window shown in FIGS. 7 through 10, a signature check box 1710, and a legal notice 1712 describing the legal meaning of the digital signature. The list of datums 1702 is color-coded in green and red text. Green text indicates that the datum has been digitally signed. Red text indicates that the datum has not been signed. For each datum in the list 1702 that has been signed, the name of the signatory and the date of signature is displayed.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

The invention claimed is:

1. A system for consummating, managing, and retrieving at least one digitally signed, legally binding contract between a consumer of manufacturing services and at least one manufacturing vendor over a network, the system comprising:
   a central controller for rendering a three-dimensional representation of an article design;
   a transmitter for distributing the three-dimensional representation to the at least one manufacturing vendor over the network;
   a receiver for receiving at least one digital signature; and
   a processor capable of mapping the at least one digital signature to specific manufacturing instructions associated with at least one feature within the three-dimensional representation of the article design.

2. The system of claim 1, wherein the consumer of manufacturing services and the at least one manufacturing vendor are distinct and unrelated business entities, and
   wherein a business relationship between the consumer and the at least one manufacturing vendor is defined through the at least one legally binding contract including the manufacturing instructions associated with the at least one feature of the three-dimensional representation of the article design.

3. The system of claim 1, wherein the at least one digital signature is applied by a representative of the at least one manufacturing vendor.

4. The system of claim 3, wherein the digital signature of the representative is applied to only the manufacturing instructions for which the representative has authorization.

5. The system of claim 3, wherein the at least one representative of the manufacturing vendor is qualified to evaluate compliance and the at least one digital signature is applied to the manufacturing instructions to ensure compliance with the manufacturing instructions; and
   wherein the at least one digital signature is included in said legally binding contract.

6. The system of claim 1, wherein the at least one digital signature is applied by at least one representative of the consumer of the manufacturing services for the purpose of ensuring the accuracy of the manufacturing instructions, and where the at least one digital signature is included in the at least one legally binding contract.

7. The system of claim 6, wherein the at least one representative of the consumer is qualified to evaluate compliance and is responsible for verifying compliance with manufacturing instructions.

8. The system of claim 6, further comprising a central data store containing the at least one digital signature, where the at least one digital signature is associated with the manufacturing instructions associated with particular features within the three-dimensional representation of the article design.

9. The system of claim 1, further comprising a central data store containing the at least one digital signature, where the at least one digital signature is associated with the manufacturing instructions associated with particular features within the three-dimensional representation of the article design.

10. The system of claim 1, further comprising a central data store containing the three-dimensional representation of the article design, the specific manufacturing instructions associated with the article design, and the at least one digital signature.

11. The system of claim 1, further comprising a software module for managing the distribution of the three-dimensional representation of the article design and associated manufacturing instructions to the at least one manufacturing vendor over the network.

12. The system of claim 1, wherein said processor further validates and secures the at least one digital signature as legally valid and enforceable.

13. A process for consummating, managing, and retrieving at least one digitally signed, legally binding contract between a consumer of manufacturing services and at least one manufacturing vendor over a network, the process comprising the steps of:
   distributing a three-dimensional representation of an article design to the at least one manufacturing vendor over the network;
   receiving at least one digital signature; and
   mapping the at least one digital signature to specific manufacturing instructions associated with at least one feature within the three-dimensional representation of the article design.

14. The process of claim 13, wherein the consumer of manufacturing services and the at least one manufacturing vendor are distinct and unrelated business entities, and wherein a business relationship between the consumer and the at least one manufacturing vendor is defined through at least one legally binding contract including the manufacturing instructions associated with the at least one feature of the three dimensional representation of the article design.

15. The process of claim 13, wherein the at least one digital signature is applied by a representative of the at least one manufacturing vendor.

16. The process of claim 15, wherein the digital signature of the representative is applied to only the manufacturing instructions for which the representative has authorization.

17. The process of claim 15, wherein the at least one representative of the manufacturing vendor is qualified to evaluate compliance and the at least one vendor digital signature is applied to the manufacturing instructions to ensure compliance with the manufacturing instructions; and
wherein the at least one digital signature is included in the at least one legally binding contract.

18. The process of claim 13, wherein the at least one digital signature is applied by at least one representative of the consumer of the manufacturing services for the purpose of ensuring the accuracy of the manufacturing instructions, and where the at least one consumer digital signature is included in the at least one legally binding contract.

19. The process of claim 18, wherein the at least one representative of the consumer is qualified to evaluate compliance and is responsible for verifying compliance with the manufacturing instructions.

20. The process of claim 18, further comprising the step of storing the at least one digital signature, where the at least one digital signature is associated with the manufacturing instructions associated with particular features within the three-dimensional representation of the article design.

21. The process of claim 18, further comprising the step of storing the at least one digital signature, where the at least one digital signature is associated with the manufacturing instructions associated with particular features within the three-dimensional representation of the article design.

22. The process of claim 13, where the at least one manufacturing vendor comprises a plurality of manufacturing vendors, and
further comprising the step of managing the distribution of the three-dimensional representation of the article design and associated manufacturing instructions to the plurality of manufacturing vendors.

23. The process of claim 13, further comprising the step of storing the three-dimensional representation of the article design, the specific manufacturing instructions associated with the article design, and the at least one digital signature.

24. The process of claim 13 further comprising the steps of validating and securing the at least one digital signature as legally valid and enforceable.

25. A system for consummating, managing, and retrieving at least one digitally signed, legally binding contract between a consumer of manufacturing services and at least one manufacturing vendor over a network, the process comprising the steps of:
means for distributing a three-dimensional representation of an article design to the at least one manufacturing vendor over the network;
means for receiving at least one digital signature; and
means for mapping the at least one digital signature to specific manufacturing instructions associated with at least one feature within the three-dimensional representation of the article design.

* * * * *